March 12, 1968  F. C. TAYLOR  3,372,957
WEDGE BAND FOR WHEEL RIM STRUCTURE
Filed Feb. 7, 1966
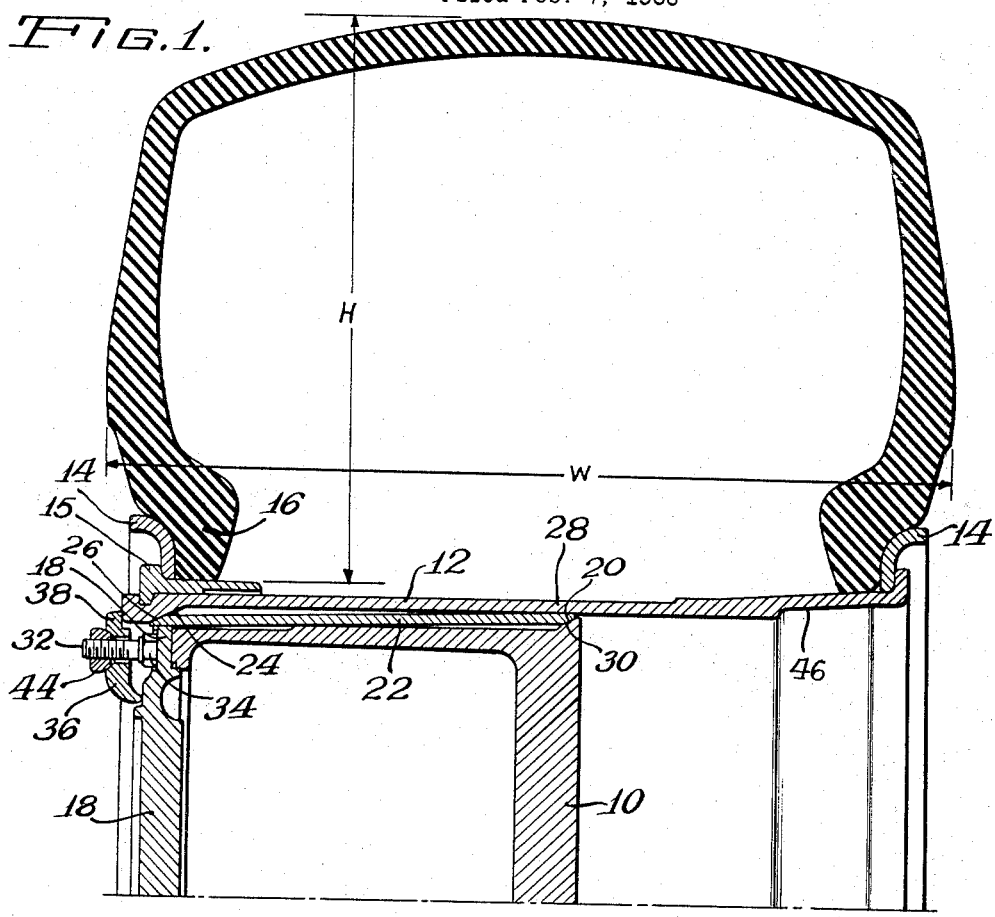
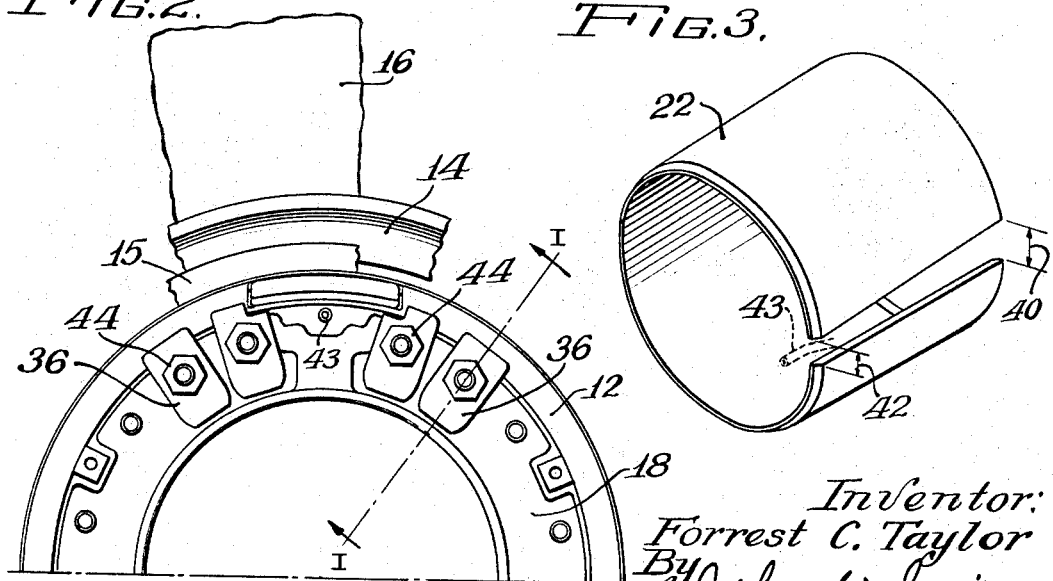
Inventor:
Forrest C. Taylor
By John W. Gaines
Atty.

United States Patent Office 3,372,957
Patented Mar. 12, 1968

3,372,957
WEDGE BAND FOR WHEEL RIM STRUCTURE
Forrest C. Taylor, Northlake, Ill., assignor to International Harvester Company, Chicago, Ill., a corporation of Delaware
Filed Feb. 7, 1966, Ser. No. 525,746
9 Claims. (Cl. 301—18)

ABSTRACT OF THE DISCLOSURE

Adapter to mount single rim on dual wheel. The adapter comprises a substantially circumferentially continuous, wide wedge band which is variable in configuration, made in one piece, and formed with an external frusto-conical surface at one end and with an internal bevel at the other.

---

The wheel and rim construction, as shown in FIGURES 1, 2, and 3 of the drawings, includes a cylindrical, hollow wheel 10, a rim therefor having a rim base 12 and rim flanges 14 securely retained one at each end of the base, and a tubeless pneumatic tire 16 mounted on the rim. A disengageable lock ring 15 at the outer end of the rim base 12 allows the flange 14 at that end to be withdrawn for installation and removal of the tire. An end flange 18 covers the mouth of the wheel at its outer end, i.e., the outer end in terms of the wheel-supported vehicle, not shown, which carries the wheel. The wheel 10 at the inner end has a frusto-conical end surface 20. The surface 20 is on the outside of the larger end of the wheel and increases in diameter in the direction of that end.

A reuseable split wedge band 22, which in the free state is cylindrical, is supported by the end flange 18 and by the frusto-conical surface 20, and supports the rim base 12. More specifically, a thickened outer end of the rim base 12 has an internal bevel 24 supported on a substantially annularly continuous, frusto-conical surface 26 formed at the external corner of the outer end of the wedge band 22. At the inner end, the wedge band 22 has its outer surface compressed against the adjacent supported part 28 of the rim base 12 and has an inside bevel 30 at the corner compressed against the frusto-conical surface 20. The result is that the supported part 28 is on a substantially annularly continuous surface for the transmission of vehicle and torque loads without deflection or slip.

The wheel 10 carries a ring of threaded, hold down studs 32, which may number 16 studs, for example, and which extend axially outwardly through registered openings in the flange 18 to an external point. Each stud 32 carries a nut 34 which is threaded thereon to hold the flange 18 in place. Each stud 32 also carries a rim clamp 36 fulcrumed at its inner end against the flange 18.

The radially outer end 38 of each rim clamp 36 engages the thickened outer end of the rim base 12, so that the base and wedge band 22 slide into place with the wedge band 22 under axial compression. Thus, it distorts from the referred to cylindrical configuration in the free state into the flared shape as illustrated by the solid lines 22 in FIGURE 3, increasing in diameter in the direction of the inner end of the wheel. The opposite legs at the split accommodate by having a wider gap 40 therebetween at the latter end, and by having a narrower gap 42 therebetween at the outer end. In one physical example, the normal free state gap of 4.4" was increased to 4.6" when wider open at 40 and was decreased to 4.2" when narrower at 42 adjacent the outer end.

Illustrative of further dimensions in that example, the undistorted band 22 was 7/16" thick steel plate having a nominal inside cylinder diameter of 21.38"; and the tire 16 was a 33–25 hard rock, lug, truck tire. The tire width W was 33.45" and, in the carcass cross-sectional view, the outside height H was 2.25", yielding a W to H ratio of 1.5:1.

The band 22 is rotationally oriented when placed on the wheel 10 so that the gap 42 straddles a pneumatic valve stem 43 (FIGURES 2 and 3) which is carried on the inner side of the rim base 12 and which has communication, not shown, with a radial opening through the latter so as to inflate and deflate tire 16.

The portion of the length of the rim base 12, from the supported outer end thereof engaged by the clamp end 38 to the supported part 28, constitutes the sole supported portion, measuring approximately 56½% of its total length of 31.25" and thus barely amounting to a major portion of such total length. However, the rim is firm in all directions, and a set of nuts 44 between the studs and clamps is drawn down on the threaded studs 32 to adjust the final seating pressure.

The band bevel 30 due to a first complementary conical angle wedges the band between the supported rim part 28 and the wheel, and locks the band and rim against inward axial displacement. The frusto conical surface 26 on the band due to a second, complementary conical angle wedges it betwen the rim and confronting wheel end flange 18, and the ends 38 of the individual wheel clamps lock the rim and band against outward axial displacement. The conical angles were each 28° (FIGURE 1) in one satisfactory embodiment of the invention, and each of the two conical surfaces, not numbered, proved satisfactory when provided with a diagonal width of only 11/16" (FIGURE 3).

The inherent dual wedging adjustment afforded by this simple one piece band insures solid rim seating and accommodation to all of the usual wheel machining variations and tolerances and, in such regards as these, lies a brief summary of the invention. The effectiveness is attested to by the lack of difficulty encountered in employing the exaggeratedly overhanging cantilever portion 46, whereat the rim 12 is unsupported.

I claim:
1. In combination:
   a wedge band variable in configuration and split so that the opposite legs are closely spaced apart to define a gap therebetween, and formed with an external frusto-conical surface at a first end of the band which increases in diameter in the direction of the second end thereof, and formed with an internal bevel at the second end of the band;
   a rim base; and
   a vehicle wheel having a frusto-conical second end, the surface of which increases in diameter in the direction of the second end and which receives thereabout the wedge band, and arranged with the bevel received in complementary sliding contact on the frusto-conical second end surface;
   said rim base having a part thereof supported solidly on, and radially stressed by wedging action of, the second end of the wedge band; the rim base having a first end substantially radially aligned with a corresponding first end portion of the wheel and said first end of the band, and having an internal bevel so as to be received in complementary sliding contact on the frusto-conical surface of said first end of the band.

2. The combination of claim 1, including:
   means on the wheel engageable with the rim base to trap the wedge band under compression between the bevelled first end of the rim base and the frusto-conical second end of the wheel, whereby the first and second ends of the wedge band provide two substantially continuous wedging surfaces transmitting the vehicle and torque loads between the vehicle wheel and the rim base.

3. The combination of claim 2, the band (22) characterized by a plate comprising a steel wedge of cylindrical shape in free state.

4. The combination of claim 3, characterized by:

said wheel being larger at the second end than at its first end portion;

said wedge band when compressed, distorting from said normally cylindrical shape into a flared shape increasing in diameter in the direction of the second end of the wheel.

5. The combination of claim 4, characterized by:

the split of the wedge band affording accommodation of the opposite legs to distortion by causing the gap to adjust closer (42) and wider open (40) at the respective first and second ends of the wheel.

6. The combination of claim 2, characterized by:

said wheel being a hollow structure having a mouth at its first end, the first end portion aforesaid of the wheel comprising a flange (18) closing the mouth of the hollow wheel structure.

7. The combination of claim 2, characterized by:

said means comprising a number of spaced apart clamps (36) carried in a ring about, and each fulcruming on, the wheel, and clamping inwardly and directly against the first end of the rim base at that number of spaced apart points.

8. The combination of claim 2, further including:

a pneumatic tire (16) mounted on said rim base having a ratio, as viewed in carcass cross section, of outside width to height of at least approximately 1.5:1.

9. The combination of claim 8, characterized by:

the portion of the length of said rim base from the first end to said supported part (28) thereof constituting the sole support portion, and barely amounting to a major portion of said length.

References Cited

UNITED STATES PATENTS

| | | | |
|---|---|---|---|
| 1,132,648 | 3/1915 | Booth | 301—22 |
| 1,869,635 | 8/1932 | Walther | 301—13 |
| 1,884,936 | 10/1935 | Walther | 301—12 X |
| 1,893,947 | 1/1933 | Keller | 301—13 |
| 2,599,248 | 6/1952 | Forbes | 301—12 |
| 3,160,442 | 12/1964 | Walther | 301—12 |

RICHARD J. JOHNSON, *Primary Examiner.*